Oct. 3, 1967 G. B. SCHAPAUGH 3,345,124
APPARATUS FOR CLEANING AND STERILIZING DENTURES
Original Filed July 22, 1963
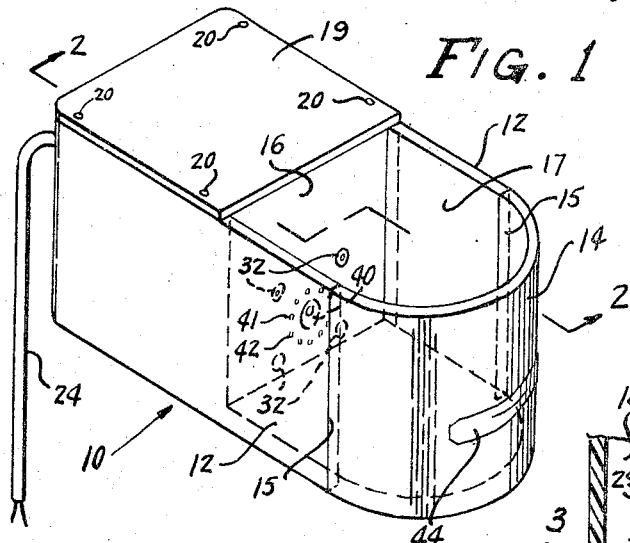
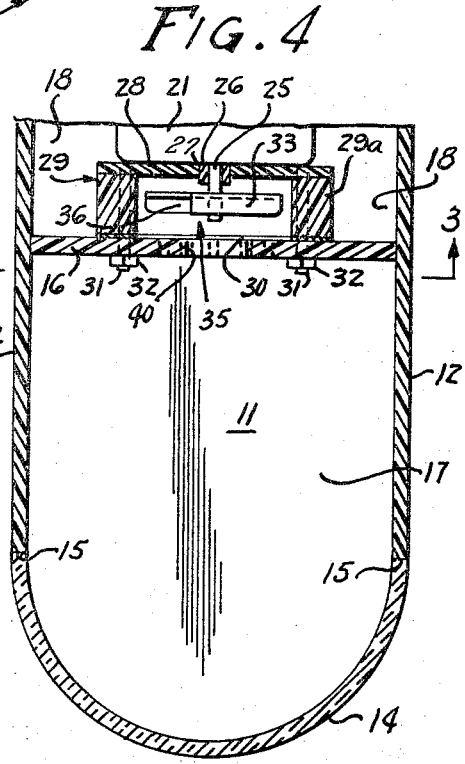
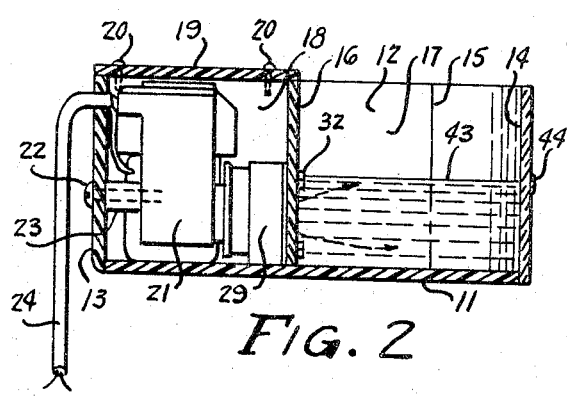
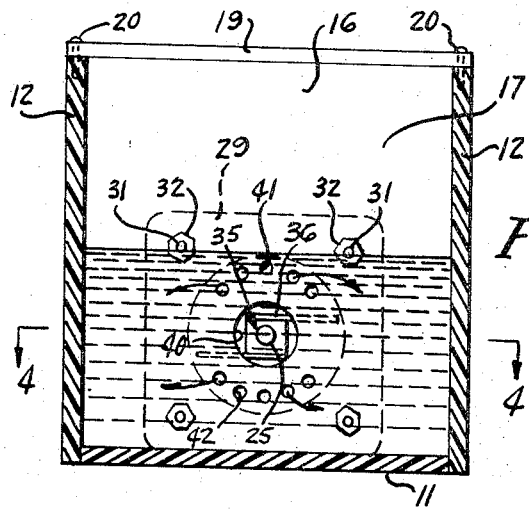
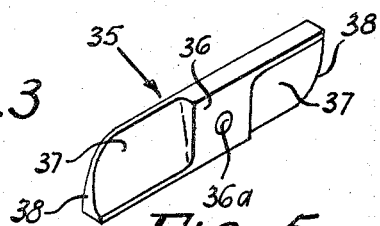
INVENTOR.
GORDON B. SCHAPAUGH
BY
Kimmel & Crowell
ATTORNEYS.

United States Patent Office 3,345,124
Patented Oct. 3, 1967

3,345,124
APPARATUS FOR CLEANING AND
STERILIZING DENTURES
Gordon B. Schapaugh, 3710 E. 39th St.,
Tulsa, Okla. 74135
Continuation of application Ser. No. 296,619, July
22, 1963. This application Dec. 6, 1966, Ser. No.
599,649
4 Claims. (Cl. 21—87)

This application is a continuation application of Ser. No. 296,619, filed July 22, 1963, now abandoned.

This invention relates to cleaning and sterilizing apparatus and has particular applicability to such an apparatus for cleaning and sterilizing dentures.

The common practice among denture wearers is to remove the denture plates at night and let them soak during the night in a glass or other vessel with either plain water or some solution, the idea being thereby to let the dentures cleanse themselves. Oftentimes the dentures are scrubbed. In either event the process is less desirable and does not produce the results that can be obtained with the instant invention whereby there is provided a simple, efficient, and quiet apparatus, including a receptacle for the dentures, whereby when the dentures are merely placed in said receptacle and left therein for a brief period of time, the dentures will be cleaned and sterilized through the gentle yet very efficient action of a steady flow of liquid in the receptacle.

A primary object of this invention is, therefore, to provide, in a manner as will hereinafter be set forth, a quiet, efficient denture plate cleaning and sterilizing apparatus by means of which the dentures are automatically cleaned and sterilized with no more attention required than to place the dentures in the liquid in the receptacle provided as a portion of the apparatus, and start the apparatus to set the liquid in motion.

Other objects will in part be pointed out hereinafter and in part be apparent as the description of the invention proceeds and shown in the accompanying drawing wherein:

FIGURE 1 is a perspective view of one form of apparatus embodying the instant inventive concept.

FIGURE 2 is a sectional view taken substantially along the line 2—2 of FIGURE 1 as viewed in the direction indicated by the arrows.

FIGURE 3 is an enlarged transverse sectional view taken substantially along the line 4—4 of FIGURE 3 as viewed in the direction indicated by the arrows:

FIGURE 4 is a sectional view on a horizontal plane taken substantially along the line 3—3 of FIGURE 4 as viewed in the direction indicated by the arrows.

FIGURE 5 is a perspective view of a constructional detail.

Similar reference characters refer to similar parts throughout the several views of the drawing.

Having reference now to the drawings in detail, the device of the instant invention comprises a receptacle, generally indicated at 10, which includes a substantially flat bottom 11, side walls 12, a rear wall 13, and an arcuate front or end wall 14. The side and front rear or end walls may be constructed as a unit, or alternatively, the arcuate front wall portion may be of a separate piece of plastic or other suitable material sealed to the side walls at points 15 in fluid tight relation.

In a preferred embodiment of the invention all the apparatus is constructed of translucent material, such as plastic, or the like, with the exception of arcuate wall 14, which is preferably transparent.

A transverse partition 16 divides the receptacle 10 into two compartments, one of which 17 is adapted to contain the dentures to be cleaned and sterilized, and the other of which 18 comprises a motor compartment.

A cover 19 is provided for the compartment 18, and is secured in position by means of suitable screws 20 or the like.

Compartment 18 contains a suitable electric motor 21 of any desired conventional type, which may be mounted as by means of screws 22 extending through rear wall 13 into studs 23 comprising an integral part of the motor assembly. Current is supplied to the motor in any desired manner as by a cord 24, although if desired batteries may be substituted.

Motor 21 includes drive shaft 25, which extends through a sealing bushing 26 in an opening 27 and a partition 28 which comprises the rear wall of a fluid tight casing 29, having a perimetric wall 29a secured in sealed relation to rear wall 28. Casing 29 is secured to partition 16, on the side within compartment 18, in sealed relation by means of a gasket 30, and studs 31 which extend through suitable openings in partition 16 and are secured in tight relation by means of nuts 32. Shaft 25 carries a rotatable impeller generally indicated at 35 within the fluid tight casing formed by wll 28 and perimetric wall 29a.

The impeller 35 is best shown in FIGURE 5 and comprises a substantially rectangular hub 36 having a central opening 36a in which the shaft 25 is engaged. Two oppositely extending blades 37 extend from the hub, and are oppositely inclined. Blades 37 are provided with oppositely curved tips 38, the curvature being outward from the thinner portion of the blade toward the thicker portion thereof. When taken in conjunction with openings in partition 16, to be more fully described hereinafter, this occasions a radial flow of fluid in a direction from the center outwardly.

As best shown in FIGURE 3, a relatively large central opening 40 is provided in partition 16 coaxial with shaft 25, and of a diameter substantially equal to the diagonal extent of the rectangular hub 36.

An upper series of radially disposed openings 41 is provided above the central opening 40, and a corresponding lower series of radial openings 42 is provided below the central opening, the openings 41 and 42 being equal in size, and equidistantly spaced from the center of opening 40. By virtue of this arrangement when the receptacle or compartment 17 is filled with fluid to a point or line 43, indicated by a marker plate 44 on the transparent front wall 14, fluid is drawn inwardly through the opening 40 into the compartment or receptacle defined by walls 29a and 28 and thence by the action of the rotor or impeller 35 is forced outwardly through the radial openings 41 and 42. The specific arrangement of these upper and lower series of openings occasions a flow of liquid outwardly over the upper and lower plates of the denture.

Plain water may be employed in the device, if desired, or a suitable sterile or cleansing solution, or any other fluid matter normally employed in the cleaning and sterilizing of dentures.

Obviously, all that is necessary to utilize the device is to place the dentures in the receptacle 17 and start the motor 21, by means of any desired conventional switch, or the like (not shown), whereupon a gentle, quiet and efficient circulation of the sterilizing fluid will be effectuated by the impeller 35, the fluid being drawn inwardly through the opening 40 and expelled outwardly through the openings 41 and 42, thus thoroughly and effectively sterilizing the dentures in a relatively brief period of time.

From the foregoing it will now be seen that there is herein provided an improved cleaning and sterilizing apparatus for dentures, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. A cleaning and sterilizing apparatus for dentures comprising:
 a receptacle formed of a bottom wall, upstanding side walls, and upstanding rear wall, and an upstanding inwardly concave front wall;
 a planar, substantially vertical, transverse partition extending between the side walls dividing the receptacle into a motor compartment and a denture receiving compartment, the partition having a substantially circular central inlet aperture therethrough, at least one smaller outlet opening below the inlet aperture and at least one smaller outlet opening above the inlet aperture, said outlet opening being spaced radially substantially equidistant above and below the inlet aperture;
 means forming an impeller compartment in the motor compartment, said impeller compartment surrounding and being in communication with the inlet aperture and the outlet openings;
 a motor, in the motor compartment, having a horizontal rotatable shaft extending into the impeller compartment in sealed relation therewith, the rotatable shaft being coaxial with the central inlet aperture; and
 a fluid impeller on the shaft spaced inwardly of the inlet opening, in the impeller compartment, comprising,
  a substantially rectangular hub having a diagonal dimension substantially equal to the diameter of the inlet aperture,
  at least two blades extending from the hub, said blades being inclined relative to each other and provided with oppositely curved tips, the curvature being outward from a thinner portion of the blade toward a thicker portion thereof, for producing a radial flow of fluid inwardly through the central inlet aperture, radially in the direction of the blade extension, and outwardly through the upper and lower outlet openings over the upper and lower plates of the denture.

2. In a denture cleaning apparatus of the type having a compartment for receiving dentures, the improvement wherein:
 the denture receiving compartment is shaped in a configuration corresponding to the denture shape,
  is of a size for receiving the dentures and permitting the dentures to be covered by a minimum quantity of liquid when placed in a horizontal position in the denture receiving compartment, said compartment having,
   a bottom wall, upstanding side walls, an upstanding inwardly concave front wall, and an upright wall opposite the front wall intersecting the side walls,
  said upright wall having a central inlet aperture therethrough, at least one outlet opening below the inlet aperture and at least one outlet opening above the inlet aperture, said outlet openings being approximately of the same size but smaller than the inlet aperture and spaced radially substantially equidistant above and below the inlet aperture,
 means exterior to the denture receiving compartment forming an impeller compartment surrounding and being in communication with the inlet aperture and the outlet openings,
 a fluid impeller in the impeller compartment comprising a hub substantially coaxial with and adjacent to the central inlet aperture having a transverse dimension substantially equal to that of the central inlet aperture, at least two blades extending from the hub, said blades being inclined relative to each other, for withdrawing liquid from the denture receiving compartment through the central inlet aperture, producing radial flow of liquid in the impeller compartment, inwardly from the central inlet aperture, radially along the direction of the blades, and outwardly through the upper and lower outlet openings, discharging the liquid therefrom into the denture receiving compartment for circulating the liquid from between the dentures into the impeller compartment and over and under the dentures in the denture receiving compartment,
 and impeller drive means.

3. The apparatus of claim 2 wherein:
the impeller hub is rectangular and the central inlet aperture is circular.

4. The apparatus of claim 3 wherein:
the blades comprise,
 a thick portion tapering to a relatively thinner edge portion, having
  curved tip portion, said curvature being outwardly from the thinner portion to the thicker edge portion.

References Cited
UNITED STATES PATENTS

| | | | |
|---|---|---|---|
| 1,090,406 | 3/1914 | Nelson | 134—194 X |
| 1,145,607 | 7/1915 | Morris | 259—107 X |
| 1,658,413 | 2/1928 | Patelski | 134—194 X |
| 1,722,272 | 7/1929 | Buck et al. | 259—107 X |
| 2,729,087 | 1/1956 | Harrel | 134—194 X |

JOSEPH SCOVRONEK, Acting Primary Examiner.

J. ZATARGA, Assistant Examiner.